No. 607,044. Patented July 12, 1898.
J. JENKINS.
SUPPLY TANK FOR GASOLENE STOVES.
(Application filed Oct. 2, 1897.)
(No Model.)
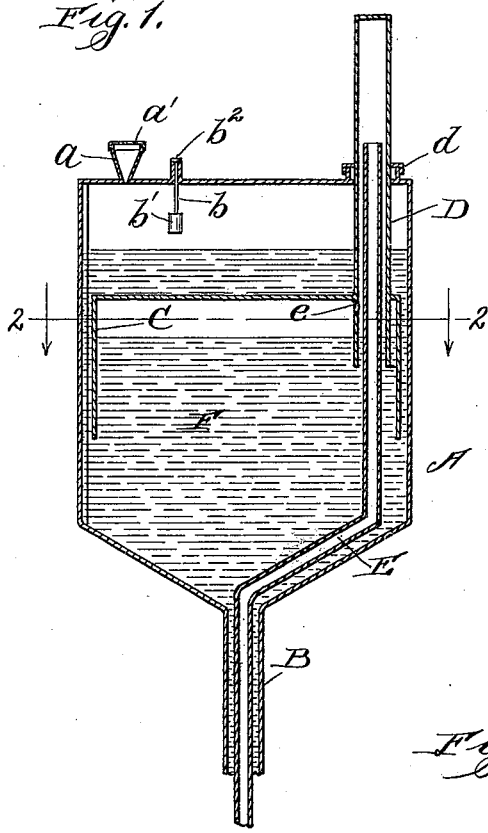
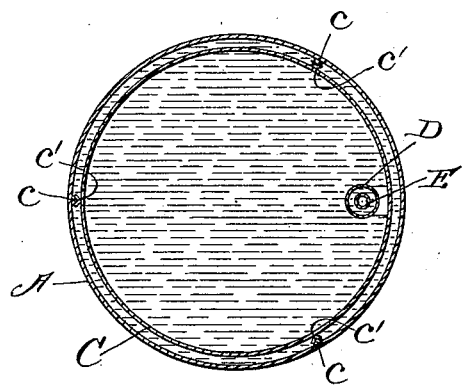
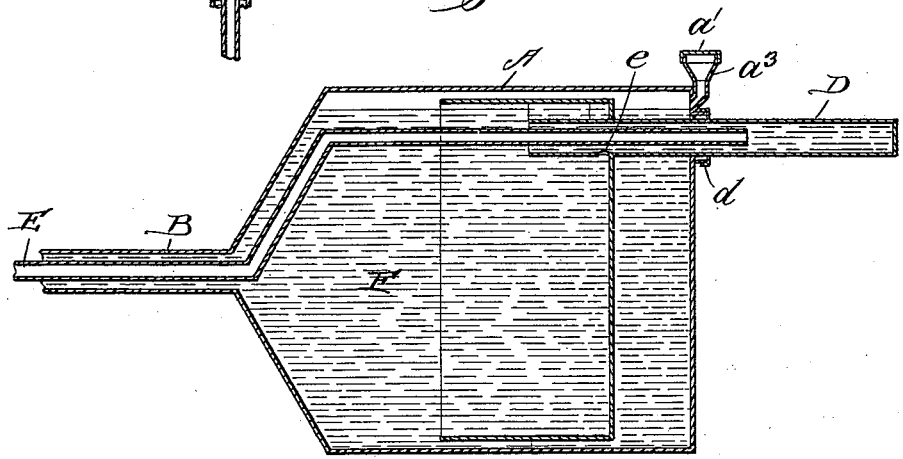
Witnesses:
W. J. Jacker.
E. A. Duggan.
Inventor:
Jay Jenkins
By Chas. C. Tillman Atty.

200~# UNITED STATES PATENT OFFICE.

JAY JENKINS, OF CHICAGO, ILLINOIS.

SUPPLY-TANK FOR GASOLENE-STOVES.

SPECIFICATION forming part of Letters Patent No. 607,044, dated July 12, 1898.

Application filed October 2, 1897. Serial No. 653,822. (No model.)

*To all whom it may concern:*

Be it known that I, JAY JENKINS, a citizen of the United States, residing at Chicago, in the county of Cook and State of Illinois, have invented certain new and useful Improvements in Supply-Tanks for Gasolene-Stoves, of which the following is a specification.

This invention relates to improvements in a tank or vessel to be used for supplying gasolene or similar liquid fuel to stoves or burners used in that type of stoves known as "gasolene-stoves," and while it is more especially designed and intended for the reception of gasolene, yet it may be used as a supply-receptacle for other liquids or oils; and it consists in certain peculiarities of the construction, novel arrangement, and operation of the various parts thereof, as will be hereinafter more fully set forth and specifically claimed.

The objects of my invention are, first, to provide a supply tank or vessel which shall be simple and inexpensive in construction, strong, durable, and effective in operation, and which may be embodied either in an upright tank or vessel or what is known as the "drop-tank," and, second, a supply tank or vessel in which the vapor arising from the gasolene or other liquid contained therein will be held and compressed by means of a movable inner vessel, from which the vapor will flow or be forced through suitable pipes or tubes to the burner, where it may be ignited and thus utilized to heat the burner or generator in order to gasify the gasolene as it escapes from its pipe or tube.

In order to enable others skilled in the art to which my invention pertains to make and use the same, I will now proceed to describe it, referring to the accompanying drawings, in which—

Figure 1 is a vertical sectional view of an upright tank or vessel embodying my invention. Fig. 2 is a cross-sectional view taken on line 2 2 of Fig. 1, looking in the direction indicated by the arrows; and Fig. 3 is a central sectional view of a drop-tank embodying my invention, showing the vessel in position to be filled with gasolene or oil.

Similar letters refer to like parts throughout the different views of the drawings.

A represents a vessel or reservoir which may be made of any suitable size, form, and material, but preferably cylindrical in shape, as shown in the drawings. The lower portion of the tank or vessel A is usually funnel-shaped and is provided with an outlet or supply pipe B, which communicates with the generator or burner, (not shown,) which may be of the ordinary or any preferred construction. In the top of the vessel A is located an inlet-funnel $a$, which is used to conduct the gasolene or other liquid into the vessel and is provided with a cap $a'$ or other suitable covering to close the same. The top of the vessel A is also provided with an indicator comprising a rod $b$, which passes through a suitable opening in the vessel's top and has on its lower end a cork or float $b'$, which when the vessel is nearly filled will rest on the surface of the liquid and rise therewith, thus causing the head $b^2$ of the indicator to be lifted and indicating that the vessel is almost filled. At suitable points on its inner surface the vessel A is provided with vertical ribs or pieces $c$, usually V-shaped in cross-section, which fit into similarly-formed ribs or strips $c'$, located on the outer surface of the movable inner vessel C, which, as shown in Fig. 1 of the drawings, is somewhat smaller in circumference than the vessel A and has its lower portion open. Passing through the top of the inner vessel C and extending some distance thereinto is a tube D, which is rigidly secured to the vessel C and moves therewith and passes through an opening provided with suitable packing $d$ in the top of the outer vessel or tank. Extending into the tube or pipe D and usually above the top of the vessel A is a pipe or tube E to receive and conduct the vapor arising from the gasolene to the burner or generator, with which it may be connected in any suitable manner.

In Fig. 3 of the drawings I have shown a drop-tank embodying my invention, in which the various parts are of the same construction as above set forth, with the exception of the funnel-shaped inlet $a^3$, which is provided with a cap or covering $a'$, as in the first-named construction, and which inlet occupies a vertical position, as shown in Fig. 3 of the drawings, when the tank is tipped to the position illustrated in the last-named figure, which position it will occupy during the operation of filling the same. In this modified construction a device to indicate approximately the quantity of liquid within the vessel may be located near the funnel-shaped inlet $a^3$ and in parallelism therewith, and said indicator may be of the same construction as that shown in Fig. 1 of the drawings and above described.

The operation of my device is simple and as follows: The gasolene or other liquid F is placed in the reservoir or vessel A through the funnel-shaped inlet in its top, when the vapor arising therefrom will be held within the upper portion of the movable vessel C, from whence it will pass through the opening $e$, with which the tube D is provided, into said tube, and from thence into and through the tube E to the burner or generator, where it may be ignited and allowed to burn until the generator or burner shall have become sufficiently heated to gasify the escaping oil or gasolene from the supply-pipe B, which, as before stated, is connected to the outer vessel or reservoir. The weight of the inner or movable vessel C will be sufficient to slightly compress the vapor and will thus automatically cause it to be discharged through the pipe E or vapor-tube.

Having thus fully described my invention, what I claim as new, and desire to secure by Letters Patent, is—

1. The combination with an outer tank or vessel having in its lower portion a supply-pipe, of a movable vessel located therein, a tube communicating with the interior of the movable vessel and extending through the top of the outer vessel, and another tube extending into the first-named tube and through the supply-pipe of the outer vessel, substantially as described.

2. The combination of the vessel A, having the supply-pipe B, communicating therewith, of the movable vessel C, located within the supply-tank, the tube D, extending through the tops of the vessels A, and C, and fixed to the latter and having the opening $e$, the pipe E, located in the supply-pipe B, and extending into the pipe D, substantially as described.

JAY JENKINS.

Witnesses:
CHAS. C. TILLMAN,
E. A. DUGGAN.